United States Patent Office 3,063,972
Patented Nov. 13, 1962

3,063,972
CONDENSATION PRODUCTS OF TETRAFLUORO-ETHYLENE AND SULFUR CHLORIDE PENTA-FLUORIDE
Hugh Leithead Roberts, Northwich, England, assignor to Imperial Chemical Industries Limited, Millbank, London, England, a corporation of Great Britain
No Drawing. Filed Sept. 18, 1959, Ser. No. 840,796
Claims priority, application Great Britain Oct. 1, 1958
4 Claims. (Cl. 260—79)

This invention relates to a new process for polymerising tetrafluoroethylene and for making new polymeric compounds containing carbon, fluorine and sulphur.

In a U.S. application Serial No. 806,771, filed April 16, 1959, of which this is a continuation-in-part, I have described sulphur chloride pentafluoride, $SF_5Cl$, and its preparation.

I have now discovered that under the influence of ultraviolet light this compound initiates the polymerisation of tetrafluoroethylene to give, depending on the reaction conditions, polytetrafluoroethylenes of high molecular weight, and new polymeric compounds of relatively low molecular weight which are believed to be best described as telomers of tetrafluoroethylene and sulphur chloride pentafluoride.

The new process of my invention for polymerising tetrafluoroethylene does not require an aqueous reaction system, and consequently is an improvement over known methods which require such systems and as a result cause corrosion of plant and involve the step of drying the polymer. Another advantage of my process is the ability to make polytetrafluoroethylenes of different molecular weights by varying the proportion of sulphur chloride pentafluoride added to the tetrafluoroethylene.

According to my invention I provide a process for polymerising tetrafluoroethylene and for making telomers of tetrafluoroethylene and sulphur chloride pentafluoride comprising subjecting a mixture of tetrafluoroethylene and sulphur chloride pentafluoride to the action of ultraviolet light.

The reaction should be carried out in a moisture-free environment but it may if desired take place in a suitable inert organic solvent. It is conveniently performed at atmospheric pressure but elevated pressures, for example up to several hundred atmospheres, may be used, their magnitude being determined by the strength of the polymerisation apparatus which necessarily includes components made of quartz or other materials transparent to ultraviolet light.

The reaction is usually carried out at room temperature or below, but elevated temperature for example up to about 250° C. may be employed provided means are available to remove the heat of reaction quickly enough to prevent explosive decompositions occurring.

Ultraviolet radiation of wavelengths below about 3000 A. is the preferred type, such for example as the emission from low-pressure mercury vapour lamps, which is rich in the 2537 A. line.

The molecular weight of the polymers and telomers of tetrafluoroethylene obtained in the process is largely governed by the proportion of sulphur chloride pentafluoride in the reaction mixture. When this proportion is small, for example in the range 0.1 to 0.001% molar and less, the polymers are solids with properties substantially indistinguishable from polytetrafluoroethylene made by known methods. Up to about 3% molar solids are obtained having softening points above 300° C. but with greater proportions lower melting point solids are formed whilst with proportions greater than about 30% molar mainly liquid products are obtained. It would thus appear that the process can yield a series of products ranging from high molecular weight compounds having —$CF_2$—$CF_2$— chains of such length that the end groups, which presumably are —$SF_5$ and —Cl, are such an insignificant fraction of the molecule as to have no measurable effect on its properties, down to relatively low molecular weight compounds having shorter chains whose properties are influenced by the end groups. The high molecular weight compounds for example exhibit infrared spectra indistinguishable from that of polytetrafluoroethylene made by known methods, but with decreasing molecular weight the compounds begin to show with increasing intensity a band at a wave number of 890 cm.$^{-1}$ and attributed to S—F bonds. It is these lower molecular weight compounds that I have described as telomers; they possess good thermal stability and include liquids suitable as heat-transfer agents and greases suitable as lubricants.

In one way of carrying out the process a silica reaction vessel is connected to stainless steel filling equipment by means of which the vessel may be pressurised with a mixture of tetrafluoroethylene and sulphur chloride pentafluoride up to a maximum of about 10 atmospheres. The silica vessel is irradiated with a low-pressure mercury vapour lamp and polymerisation sets in rapidly, the rate being roughly proportional to the pressure. The vessel may be repressurised several times with reaction mixture and the polymerisation carried on for several hours if desired. In the examples below which illustrate but do not restrict my invention the method of carrying out the process is as above.

Example 1

In an apparatus as described above a mixture of tetrafluoroethylene and sulphur chloride pentafluoride containing approximately 0.001% molar of the latter was introduced into the silica vessel, which had a volume of about 300 mls., and allowed to react at a maximum pressure of 7 atmospheres and at room temperature for six hours.

A white solid was obtained having a melt viscosity at 440° C. of more than $10^7$ poises and a sulphur content of less than 0.1% by weight and showing by infra-red analysis the characteristic bands attributable to polytetrafluoroethylene and no bands at a wave number of 890 cm.$^{-1}$. At 380° C. the weight loss of the solid was 0.0028% per hour.

Example 2

In a similar experiment to that of Example 1, but with a sulphur pentafluoride proportion of approximately 0.01% molar a similar white solid was obtained which showed a weight loss at 380° C. of 0.0043% per hour.

Example 3

In a similar experiment to that in Example 1, but with a sulphur chloride pentafluoride content of approximately 0.10% molar a similar white solid was obtained which showed a weight loss of 0.0091% per hour and a very slight indication by infra-red analysis of a band at a wave number of 890 cm.$^{-1}$.

Example 4

In a similar experiment to that in Example 1, but with a sulphur chloride pentafluoride proportion of approximately 1.0% molar and with a maximum pressure of about 1 atmosphere a white solid was obtained showing by infra-red analysis a small band at a wave number of 890 cm.$^{-1}$ and having a melting point of over 400° C. Analysis gave C 23.8%, F 73.6%, Cl 1.7% which corresponds roughly to a molecular weight of 2500 assuming one Cl atom per molecule.

Example 5

In a similar experiment to that in Example 4, but with a sulphur chloride pentafluoride proportion of approximately 3.0% molar a white solid was obtained which could be separated by hot extraction with carbon tetrachloride into fractions melting at approximately 315°, 150°–157° and 96–110° C. These respectively were insoluble in hot carbon tetrachloride, precipitated from it on cooling, and left behind on evaporating it. Infrared analysis of the unfractionated material showed a moderate band at a wave number of 890 cm.$^{-1}$. Analysis gave C 21.5%, F 73.0%, Cl 3.0% which corresponds roughly to an average molecular weight of 1200.

*Examples 6, 7 and 8*

In these examples presented in the table below the effect of increasing proportions of sulphur chloride pentafluoride is shown. The reactions were carried out substantially as in Example 5, but at approximately atmospheric pressure.

| Ex. | Percent molar SF$_5$Cl | Melting points of fractions | | |
|---|---|---|---|---|
| | | 1 | 2 | 3 |
| | | *Degrees* | *Degrees* | *Degrees* |
| 6 | 20 | 200–220 | 130–145 | 70–80 |
| 7 | 30 | 190–205 | 120–140 | 68–78 |
| 8 | 50 | liquid products only | | |

What I claim is:

1. A compound prepared by reaction of tetrafluoroethylene and at least 0.10 molar percent SF$_5$Cl and having the formula SF$_5$(C$_2$F$_4$)$_n$Cl in which $n$ is a positive integer, said compound having a substantial infra-red absorption band at 890 cm.$^{-1}$.

2. A compound prepared by reaction of tetrafluoroethylene and at least 0.10 molar percent SF$_5$Cl and having the formula SF$_5$(C$_2$F$_4$)$_n$Cl in which $n$ is a positive integer, said compound having a substantial infra-red absorption band at 890 cm.$^{-1}$ and a molecular weight not greater than about 2500.

3. A compound prepared by reaction of tetrafluoroethylene and at least 0.10 molar percent of SF$_5$Cl and having the formula SF$_5$(C$_2$F$_4$)$_n$Cl in which $n$ is a positive integer, said compound having a substantial infra-red absorption band at 890 cm.$^{-1}$ and a molecular weight of about 2500.

4. A compound prepared by reaction of tetrafluoroethylene and at least 0.10 molar percent SF$_5$Cl and having the formula SF$_5$(C$_2$F$_4$)$_n$Cl in which $n$ is a positive integer, said compound having a substantial infra-red absorption band at 890 cm.$^{-1}$ and a molecular weight of about 1200.

References Cited in the file of this patent

UNITED STATES PATENTS

| | | |
|---|---|---|
| 2,230,654 | Plunkett | Feb. 4, 1941 |
| 2,666,025 | Nozaki | Jan. 12, 1954 |
| 2,716,109 | Ruh et al. | Aug. 23, 1955 |